United States Patent
Ohishi

(10) Patent No.: US 6,169,846 B1
(45) Date of Patent: Jan. 2, 2001

(54) COMPRESSED VIDEO DATA RECORDING METHOD AND RECORDING APPARATUS PROVIDING IMPROVED PERFORMANCE DURING VARIABLE-SPEED PLAYBACK

(75) Inventor: Takeo Ohishi, Yokohama (JP)

(73) Assignee: Victor Company of Japan, Ltd., Yokohama (JP)

( * ) Notice: Under 35 U.S.C. 154(b), the term of this patent shall be extended for 0 days.

(21) Appl. No.: 09/259,688

(22) Filed: Mar. 1, 1999

Related U.S. Application Data

(63) Continuation of application No. 08/899,156, filed on Jul. 23, 1997, now abandoned.

(30) Foreign Application Priority Data

Mar. 17, 1994 (JP) ...................................... 6-74265

(51) Int. Cl.[7] ............................ H04N 5/917; H04N 7/26; H04N 5/91
(52) U.S. Cl. ............................................. 386/109; 386/81
(58) Field of Search .................... 386/6–8, 33, 68, 386/81, 109, 111–112; 360/8

(56) References Cited

U.S. PATENT DOCUMENTS

| | | |
|---|---|---|
| 5,140,437 | 8/1992 | Yonemitsu et al. . |
| 5,253,055 * | 10/1993 | Civanlar et al. ...................... 358/133 |
| 5,329,375 * | 7/1994 | Juri et al. .............................. 358/343 |
| 5,371,602 | 12/1994 | Tsuboi et al. . |
| 5,410,351 * | 4/1995 | Kojima ................................. 348/401 |
| 5,422,736 * | 6/1995 | Katayama ............................. 358/462 |
| 5,440,345 * | 8/1995 | Shimode ............................... 348/411 |
| 5,450,209 * | 9/1995 | Nimura et al. ....................... 358/335 |
| 5,455,684 | 10/1995 | Fujinami et al. . |
| 5,510,840 | 4/1996 | Yonemitsu et al. . |
| 5,568,274 | 10/1996 | Fujinami et al. . |
| 5,576,902 | 11/1996 | Lane et al. . |

FOREIGN PATENT DOCUMENTS 61-158633  10/1986 (JP) .

OTHER PUBLICATIONS

ISO/IEC International Standard 11172–2: 1993, Information Technology–Coding of Moving Pictures and Associated Audio for Digital Storage Media at up to About 1.5 Mbit/s–, pp.: 1–3, 5, 16, 27, 54, 85, 102 and 104.

Woo Paik, Digicipher–All Digital, Channel Compatible. IEEE tran., pp. 245–254, Dec. 1990.*

* cited by examiner

*Primary Examiner*—David R. Vincent
(74) *Attorney, Agent, or Firm*—Lowe Hauptman Gopstein Gilman & Berner, LLP

(57) ABSTRACT

A recording apparatus processes a stream of compressed video data to produce a recording signal which includes periodically occurring blocks of low-frequency video component data, for use in subsequent variable-speed playback operation. The processing is executed by selecting specific elements of low-frequency video components from the compressed video data, applying time-axis compression to the low-frequency video component elements to obtain successive data blocks, and to the compressed video data to obtain successive data blocks, between which the blocks of low-frequency video component elements are inserted.

6 Claims, 8 Drawing Sheets

I-PICTURE  P-PICTURE  B-PICTURE

I-PICTURE  P-PICTURE  B-PICTURE

FIG. 3
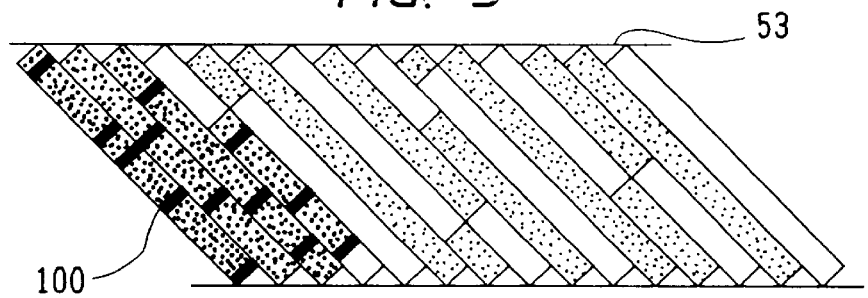
FIG. 4
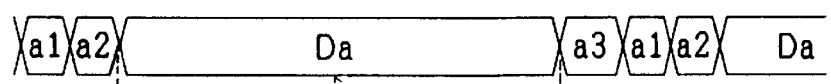
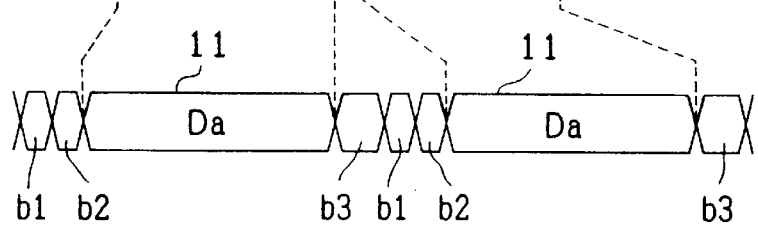
FIG. 5
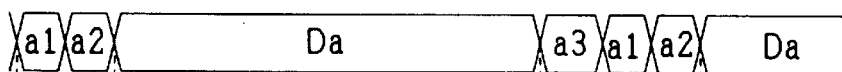
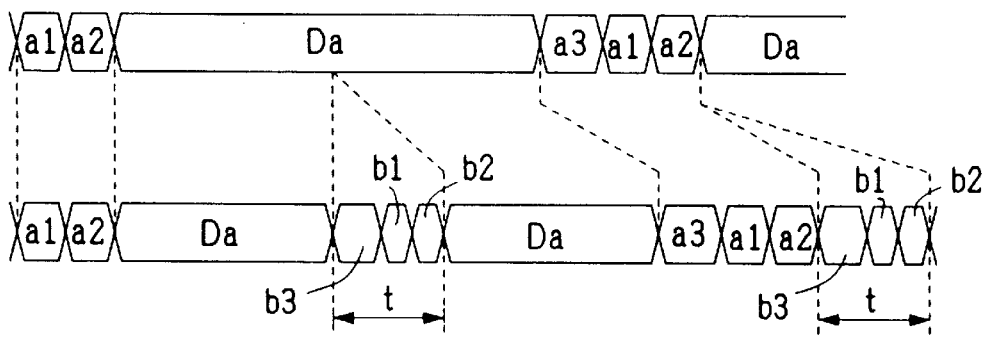

COMPRESSED VIDEO DATA RECORDING METHOD AND RECORDING APPARATUS PROVIDING IMPROVED PERFORMANCE DURING VARIABLE-SPEED PLAYBACK

This application is a Continuation of application Ser. No. 08/899,156 filed Jul. 23, 1997 now abandoned.

BACKGROUND OF THE INVENTION

1. Field of the Invention

The present invention relates to a method and apparatus for recording compressed digital video data, and in particular to a method and apparatus whereby variable-speed playback of the recorded data can be performed and which are applicable to recording of digital video data that have been compressed using an coding algorithm which utilizes motion compensation predictive coding to encode at least some of a stream of pictures, such as the MPEG algorithm.

2. Description of the Prior Art

The MPEG (Moving Pictures Experts Group) coding algorithm is now widely used for digital video signal compression. In the following, the MPEG-1 format will be assumed, although as described hereinafter the invention is equally applicable to the MPEG-2 format. The MPEG algorithm is basically a hybrid coding method, which employs motion compensation predictive coding and DCT (Discrete Cosine Transform) processing, together with quantization and variable-length coding, to attain a high level of data compression. Predictive coding is effective in achieving compression of a stream of data which expresses a moving picture as successive video pictures expressed by respective digital video signal frames, and utilizes the generally strong degree of correlation between corresponding regions of pictures which are closely time-adjacent. However in order to transmit a picture by predictive coding, it is always necessary to utilize the data of a specific preceding (or succeeding) picture as a reference, or to use both a specific preceding and succeeding picture. With the MPEG system, pictures are periodically inserted into the compressed video data stream as coded data which are derived independently from all other pictures, i.e. using intra-coding. When pictures are received which have been data-compressed by predictive coding it is not possible to randomly access these pictures, i.e. random access is only possible for the intra-coded data. In the case of video recording, the capability for random access may be important, in particular with regard to providing a variable-speed playback capability (i.e. for providing a "fast-forward" playback mode) for a digital video tape recorder. That is due to the fact that in a video tape recorder (VTR) which utilizes a a helical scan rotary recording head to scan successive diagonal tracks of a magnetic tape during a normal recording or playback mode, some tracks will be periodically skipped over by the recording head when the VTR is operated in a variable-speed playback mode. With recording of compressed video data, however, problems arise with respect to variable-speed playback. This is basically because:

(a) The data of one independently-coded picture may be recorded on a plurality of successive recording tracks; and (b) The independently-coded pictures may not occur at regular fixed periods within the stream of compressed video data.

The problems will be described in more detail, for the case of MPEG compressed video data. With the MPEG standards, the video data are arranged in a high-level data layer of units which are called GOP (Group of Pictures) units, each consisting of a plurality of pictures (expressed as respective compressed digital video signal frames) which are of three different types. Firstly, there are the aforementioned pictures which have been encoded independently, by intra-coding, and which will be referred to as I-pictures. Secondly are pictures referred to in the following as P-pictures, which have been encoded by predictive coding, using one other I-picture or P-picture as a reference. Thirdly, there are B-pictures, which have been coded by bi-directional predictive coding using a preceding I-picture or P-picture and a preceding P-picture or I-picture.

In the case of an I-picture, only the contents of an original picture are utilized. Data compression is executed by applying orthogonal transform processing, specifically, DCT (Discrete Cosine Transform) processing, to each of respective (8×8) picture element blocks of the original picture. These blocks convey either luminance or color information, and are arranged in sets of six blocks to form respective macroblocks of a digital color signal frame, as is well known, so that detailed description will be omitted. The DCT processing produces a set of DCT coefficients for each of these blocks, including a DC coefficient and a plurality of AC coefficients which are of successively higher order, extending from a lowest-order AC coefficient, within a 2-dimensional transform space. The DCT coefficient values thus obtained are then quantized, and to achieve further data compression, variable-length coding is applied to the quantized DCT AC coefficients, i.e. run-length coding which is applied (after applying quantization) to successive positions within the transform space along a zig-zag path.

With the GOP data structure, the I-pictures can theoretically be utilized for random access or variable-speed playback operation of a recording apparatus, if the GOP units occur at regular intervals within the compressed video data stream (although in general that is not the case). FIG. 1 illustrates an example of the GOP structure. In this example (assuming that GOP the units occur at fixed intervals) the I-pictures occur in the data flow at a rate of one in every 15 pictures, the P-pictures at a rate of one in every 3 pictures, and the B-pictures at a rate of 2 in every 3 pictures. The respective average proportions of data conveyed by the I, P and B pictures respectively, however, are 1:0.4:0.15.

Since as described above the P and B pictures alone cannot be used to recover the original video data, e.g. from a playback signal obtained from a video data recording apparatus, if it is required that the recording apparatus provide a variable-speed playback capability, it becomes necessary to ensure that the recorded video data includes a high proportion of intra-coded data, i.e. a high proportion of I-pictures, and to ensure that the recorded intra-coded data can be efficiently captured during variable-speed playback operation. However, as noted above, even if the I-pictures constitute only a small proportion of the total number of pictures of compressed video data, they account for a very high proportion of the compressed video data. This is due to the fact that the I-pictures do not utilize time axis correlation for data compression, and so contain much larger amounts of data than the P or B-pictures. Hence, if the proportion of I-pictures were to be increased so as to obtain more effective variable-speed playback operation, then the data compression efficiency would be lowered substantially. Thus, although it would be theoretically possible to achieve an improved variable-speed playback capability for the compressed video data if the proportion of intra-coded data within that data were to be increased, in practice that proportion must be held near the minimum amount that is necessary to ensure satisfactory picture quality in the finally obtained display picture during normal-speed playback.

In particular, in the case of a video signal which has been compressed by MPEG data compression, the compressed data flow must further include synchronizing signals, ID (identification) information, error correction information etc., which have all been subjected to a high degree of data compression before being inserted into the compressed video data stream. It is thus difficult to increase the proportion of I-pictures in the compressed video data flow, without reducing the data compression efficiency.

As a result, it has been found in the prior art that the display picture which is obtained by variable-speed playback of such recorded compressed video data does not have a natural appearance. That is due to the fact that the frequency of updating the display picture is excessively low. The reasons for that will be described in more detail referring to FIGS. 1 and 2. In FIG. 2, a GOP set of 15 pictures (shown in FIG. 1) are recorded by a VTR (video tape recorder) on 15 successive tracks on a magnetic tape, formed by helical scanning of the magnetic tape using a rotary head. It will be apparent that, for each of successive sets of 15 pictures conveyed by the video data (i.e. every 15 pictures of the original video signal prior to data compression), the total amount of data that is recorded is held constant. It can further be seen from FIG. 1 that pictures which are independent of the others, i.e. the I-pictures, constitute only 1 in every 15 pictures, although the amount of data contained in an I-picture is approximately 1/4.1 times the total amount of information in 15 pictures.

Assuming that high-speed playback of the recorded video data is performed at a speed which is 15 times the normal playback speed, and assuming that the data rate at which the playback data are obtained is identical to that used during recording of the data onto the tape, then the amount of data which is obtained by a scan of the rotary recording head across one of the tracks on which an I-picture is recorded will be only 1/15 times the total amount of data recorded on that track. In the case of an NTSC video signal encoded in the MPEG-1 format, the total amount of intra-data is approximately 1/4.1 times the total amount of compressed video data. Thus considering a set of 15 successive tracks recorded on a magnetic tape, containing such compressed video data, approximately 15/4.1 of the tracks, i.e. approximately 3.66 tracks, will contain intra-data. That is illustrated in FIG. 2, where one I-picture occurs in every 15 pictures of the compressed data stream, and is recorded recorded on 3.66 successive tracks of the magnetic tape. Thus, if the VTR were to be operated in a high-speed playback mode (with the angle of inclination of the rotational axis of the rotary recording head held unchanged), at 15 times normal playback speed, so that the rotary recording head scans obliquely across only a portion of each of periodically occurring tracks, then only 1/15 of each track will be scanned in each pass by the rotary recording head. In order to obtain the data of one I-picture during normal playback operation with this example, four consecutive tracks must be scanned. However at 15 times normal playback speed, it would be necessary to scan a total of 3.66/(1/15), i.e. approximately 55 tracks to obtain sufficient intra-coded data to update a display picture. The data which are used to form each of the resultant display pictures obtained during high-speed playback will therefore be derived from a plurality of different pictures which are substantially separate along the time axis, i.e. which may have low correlation. Hence, it becomes difficult to obtain a satisfactory level of display picture quality during high-speed playback, due to the low rate of updating.

One approach to overcoming that problem would be to decompress the compressed video data prior to recording, so that video signal frames consisting of predictive data would no longer occur, i.e. a video recording signal would be obtained whereby all of the pictures would be recorded in independent form. However in many applications is necessary or desirable to keep the video data in compressed form when recorded. In that case for example, when replayed, the compressed video data may again be transmitted to another location.

SUMMARY OF THE INVENTION

It is an objective of the present invention to overcome the problems of the prior art set out above, by providing a method and apparatus for recording of compressed video data whereby satisfactory picture quality is obtained during variable-speed playback operation, while maintaining a high degree of data compression.

To achieve the above objectives, the invention selects certain elements from indepedently-coded data the compressed video data stream, which express specific low-frequency video signal components. Time axis compression is applied to convert these low-frequency component data into continuous data blocks of specific length, and to convert the compressed video data stream also into successive data blocks of specific length, with the low-frequency component data blocks being inserted into periodic intervals which occur between the blocks of compressed video data. A recording signal can thereby be obtained, whereby the low-frequency component data blocks can be recorded on a recording tape, at regularly occurring track positions, separately from the compressed video data as a whole. Since for example each of these low-frequency component data blocks can contain a sufficiently small amount of data to be recorded on one helical-scan track, and that amount of data can be sufficient for use in producing a recognizable display picture, a high rate of display picture updating is attainable, so that satisfactory performance can be achieved, in variable-speed playback of the recorded data.

The time axis compression is preferably executed using a pair of buffer memories, for the main compressed video data and for the low-frequency component data respectively, with data being read out from these memories at a higher data rate then they are writte in. Since a stream of compressed video data such as MPEG-1 data contains syntax data which can be used to identify specific data elements, the requisite low-frequency component data elements can readily be identified and thereby selected to be written into memory.

More specifically, according to a first aspect the invention provides a method of compressed video data recording for processing a stream of compressed video data which expresses a sequence of pictures, to obtain a recording signal, and recording said recording signal on a magnetic tape by utilizing a rotary recording head, the method comprising:

periodically extracting, from said stream of compressed video data, respective sets of low-frequency component data;

applying time axis compression to said compressed video data and to said sets of low-frequency component data to obtain successive blocks of compressed video data and successive blocks of low-frequency component data, attaching at least synchronizing information and identification information to each of said blocks of compressed video data and blocks of low-frequency component data, combining said blocks of compressed video data and blocks of low-frequency component data into a single data stream, as said recording signal, and supplying said recording signal to said rotary recording head.

Each of said sets of low-frequency component data can comprise at least a minimum amount of information necessary for recognizably displaying of one of said pictures, and can be inserted into the recording signal such as to be recorded on one specific recording track.

The invention further provides a compressed video data recording apparatus for processing a stream of compressed video data expressing successive pictures, to obtain a recording signal, and for recording said recording signal on a magnetic tape by a helical scan rotary recording head, the apparatus comprising:

first memory means, and first control means for controlling writing of said compressed video data into said first memory means at a first data rate;

second memory means, and second control means for utilizing discrimination information contained in said compressed video data to select low-frequency component data from within said compressed video data flow and for controlling writing of said low-frequency component data into said second memory means;

third control means for controlling reading out of said compressed video data as sequential data blocks each of predetermined length from said first memory means at a second data rate which is higher than said first data rate, with predetermined periodically occurring vacant time intervals between reading out successive ones of said data block;

fourth control means for controlling reading out of said low-frequency component data from said second memory means, as sequential blocks each of predetermined length, at said second data rate, during respective ones of said vacant time intervals; and recording signal generating means for adding at least synchronizing information and error correction information to said compressed video data blocks and to said low-frequency component data blocks read out from said first memory means and second memory means respectively, and for combining said compressed video data blocks and said low-frequency component data blocks to obtain said recording signal.

BRIEF DESCRIPTION OF THE DRAWINGS

FIG. 3 is a diagram for illustrating a distribution of low-frequency component data track portions within the recording track pattern of FIG. 2;

FIG. 4 is a timing diagram showing an example of the relationship between an input compressed video data stream and a corresponding recording signal, with the present invention;

FIG. 5 is a timing diagram showing another example of the relationship between an input compressed video data stream and a corresponding recording signal, with the present invention;

DESCRIPTION OF PREFERRED EMBODIMENTS

Figure 1:
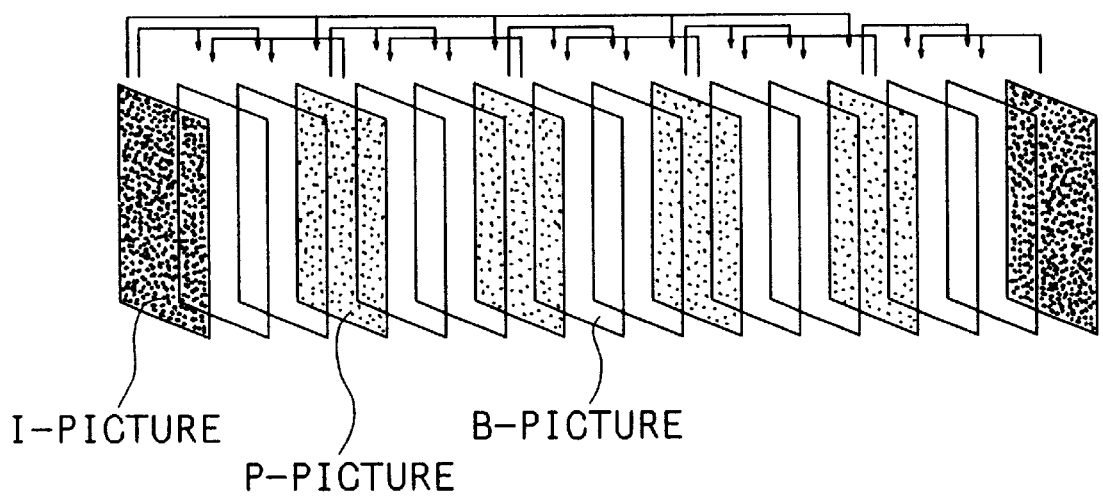
FIG. 1 is a conceptual diagram for illustrating the configuration of a GOP data unit.

Before describing the embodiments, points which must be considered with regard to variable-speed playback of a digital video signal expressing compressed video data are as follows. (In general, recording of MPEG-1 compressed video data on magnetic tape will be be assumed, unless otherwise stated). Firstly, the contents of the resultant display picture that is obtained during high-speed playback should be clearly understandable to the viewer, i.e. there should not be an excessive degree of deterioration of picture quality, although it is not essential that the picture quality be of the same level as that during normal-speed playback operation. During variable-speed playback, as described above, it is necessary to utilize data which have been independently coded, i.e. intra-coded data to update the display picture. However in the prior art, when that is done, there are disadvantages such as an excessively low frequency of updating the resultant display picture, or insufficient data obtained to provide a satisfactory level of display picture quality.

During normal-speed playback, the elements of an I-picture (i.e. successive sets of encoded quantized DCT coefficients corresponding to respectively blocks of picture elements of a block, occurring as sequential data) will be appear as a continuous sequence in the playback signal, in spite of the fact that an I-picture is recorded on a plurality of successively adjacent recording tracks. It would be possible to obtain a higher frequency of updating the display picture during high-speed playback if only a minimum necessary number of data elements (expressing low-frequency video signal components) sufficient to provide satisfactory display quality could be periodically read from the magnetic tape and used to update the display picture. However during high-speed playback, as described above, a continuous sequence of such necessary data elements will not be obtained. That point is illustrated by FIG. 3, in which the necessary minimum low-frequency video signal component elements that are contained in one I-picture of the compressed video data (such component elements being referred to in the following simply as the low-frequency component data) are indicated by the plurality of black portions 100 which are shown distributed throughout the recording tracks on which the I-picture is recorded. With an MPEG compressed video signal, such low-frequency component data consist of respective sets of encoded coefficients which express low video frequency components for each of the DCT blocks of an I-picture (so that in actuality these would be represented to a much larger number of smaller black portions than those shown in FIG. 3). It can thus be understood that it would not be practical to selectively read such data from the magnetic tape during high-speed playback.

With the present invention, that problem is overcome by extracting the low-frequency component data beforehand, from the compressed video signal that is to be recorded, and by recording these in continuous data blocks, separately from to the overall compressed video signal data, in track positions which are predetermined such as to facilitate reading of the requisite tracks (or track portions) during high-speed playback. That is achieved, for MPEG compressed video data, by extracting a specific sub-set of each of the sets of DCT coefficients which respectively corresponding to the DCT blocks of an I-picture (i.e. sub-sets which express the low-frequency component data), forming these into data blocks of specific length, and recording these blocks at separate track positions from the overall compressed video data. With MPEG compressed video data, the DCT coefficients are transmitted after having subjected to variable-length coding (i.e. run-length coding). It would be possible with the present invention to decode the DCT coefficients, then select a specific set of the DCT coefficients of an I-picture block which express the low-frequency component data, e.g. the DC coefficient and the two lowest-order AC coefficients. However in the following embodiments, it is assumed that, for each DCT block, the code for the DCT DC coefficient and the respective variable-length codes for the two lowest-order DCT AC coefficients are selected, as the low-frequency component data.

Since the amount of such low-frequency component data is much smaller than the total amount of compressed video data that has to be recorded, it becomes possible to record blocks of the low-frequency component data at periodically located positions on the magnetic tape, so that a high rate of picture updating can be achieved during high-speed playback, while ensuring a satisfactory degree of picture quality. As a specific example, it becomes possible to record all of the low-frequency component data for an I-picture on a single track of a magnetic tape, with such tracks being recorded at periodic intervals.

Figure 6:
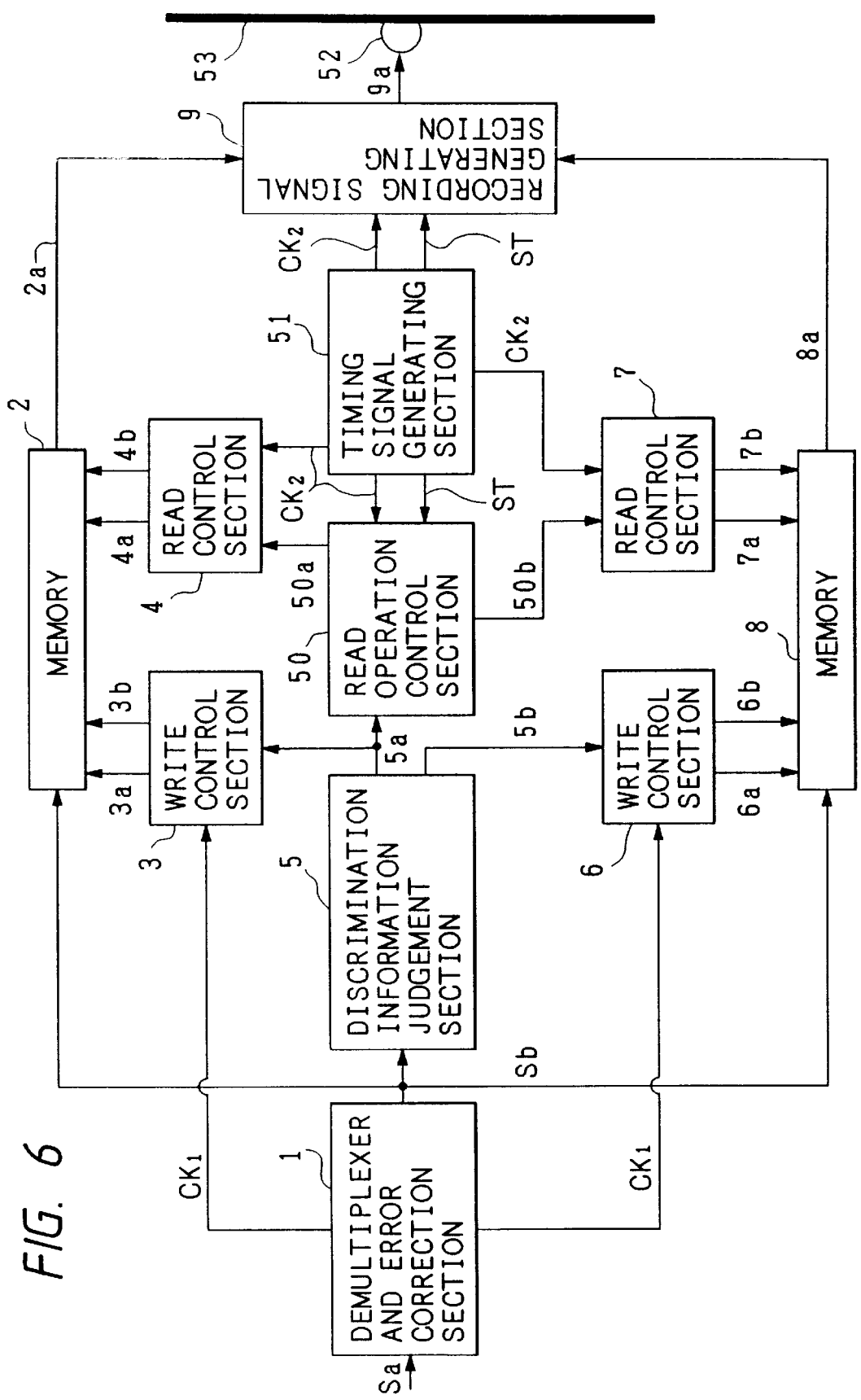
FIG. 6 is a general system block diagram of a first embodiment of a compressed video data recording apparatus according to the present invention.

FIG. 6 is a general system block diagram of a first embodiment of the invention. In FIG. 6, a digital video signal Sa expressing a stream of compressed video data is supplied to a demultiplexer and error correction section 1. The demultiplexer and error correction section 1 demultiplexes the data of the input compressed video signal Sa, to extract information that is necessary for error correction, executes the error correction, and supplies a resultant error-corrected compressed video signal Sb to a discrimination information judgement section 5. The discrimination information judgement section 5 detects syntax information (in this embodiment, MPEG syntax information) that is contained in the compressed video signal Sb and which relates to respective positions of video data elements within the data stream of signal Sb, and produces a corresponding discrimination information signal 5a which indicates these data element timings. Here, "video data elements" signifies in particular each of the (encoded) DCT coefficients for each of the DCT blocks of a picture expressed in a stream of MPEG-1 compressed video data. In this embodiment, the low-frequency component data for each DCT block will be assumed to be the code values of the three low-order DCT coefficients, i.e. the code for the DC coefficient and the variable-length codes for the two lowest-frequency AC coefficients. Each time these three code values for a DCT block of the intra-coded data within signal Sb are written into respective addresses of memory 8, an EOB (End of Block) marker is then added, i.e. is written into the next memory address. The low-frequency component data will thereby be set in the same DCT block format as the other compressed video data, upon read-out from the memory 8. Alternatively, the EOB markers could be successively attached while data are being read out from the memory 8. For simplicity of description, the means for adding these EOB markers are not described in the following, since such means can easily be envisaged by a skilled person.

FIG. 4 is a timing diagram in which diagram (A) illustrates the basic format of the compressed video data stream of signal Sa. This consists of successive compressed video data portions Da, each of which is preceded by a synchronizing information portion a1 and an ID (identifier) information portion a2, and is followed by an error correction information portion a3. The demultiplexer and error correction section 1 utilizes the synchronizing information portions a1 to detect the starting points of each of the compressed video data portions Da, then utilizes the corresponding error correction information portion a3 to correct any errors within the compressed video data portion Da. The resultant digital video signal Sb is then subjected to time axis compression processing within the remaining circuits of FIG. 6, as described hereinafter, with the previous synchronizing, ID and error correction information portions being discarded, and with new synchronizing, ID and error correction information portions b1, b2 and b3 respectively (which are required by the recording and playback process) being attached, to obtain a digital data recording signal 9a which is basically of the form shown in diagram (B) of FIG. 4.

The recording signal 9a is supplied to a helical scan rotary recording head 52, to be thereby recorded on a magnetic tape 53.

The embodiment of FIG. 6 can be modified by omitting the error correction function of the demultiplexer and error correction section 1, i.e. by processing the digital video signal Sa directly, leaving the original synchronizing, ID and error correction portions a1, a2 and a3 within the digital data recording signal 9a, together with the aforementioned new synchronizing, ID and error correction information portions b1, b2 and b3. This is illustrated in the timing diagrams of FIG. 5, in which diagram (B) shows the basic form of the resultant recording signal 9a.

The recording signal 9a further includes the aforementioned low-frequency component data, as described in the following.

In FIG. 6, the compressed video data of the error-corrected digital video signal Sb are successively written into a memory 2 at a first data rate (i.e. the data rate of the compressed video signal Sb), then read out as successive fixed-length blocks from the memory 2 at a second data rate which is higher than the first data rate, such that fixed-length vacant intervals occur at regular intervals in the data stream output from the memory 2. A clock signal $CK_1$, synchronized with the data of the compressed video data signal Sb, is extracted by the demultiplexer and error correction section 1 and used to control the timings of data write-in to two memories 2 and 8. Fixed-length low-frequency component data blocks are read out from the memory 8 at the aforementioned regular intervals, and are respectively inserted into the aforementioned vacant intervals, to thereby form the recording signal 9a. The blocks of low-frequency component data are thereby recorded on the magnetic tape 53 in each of regularly occurring fixed-duration intervals.

The digital video signal Sb is supplied to the discrimination information judgement section 5, which derives the aforementioned discrimination information as a discrimination information signal 5a, which indicates the respective timings of all of the video data elements within the compressed video data of signal Sb, and a discrimination information signal 5b which indicates the respective timings of the low-frequency component data. The discrimination information signal 5a is also supplied together with the clock signal $CK_1$ to the write control section 3, which generates successive write address values 3a and a write enable signal 3b, whereby respective elements of the compressed video data of signal Sb are written into successive addresses of the memory 2 at the first data rate (determined by clock signal $CK_1$). Assuming that the operation is in accordance with the example of FIG. 4, the write control section 3 operates, based on the discrimination information signal 5a, such as to omit the aforementioned synchronizing, ID and error detection information portions a1, a2, a3 from being written into the memory 2.

The discrimination information signal 5b from the discrimination information judgement section 5 is supplied to a write control section 6, which utilizes the discrimination information to determine the timings of data elements, within the data flow of the signal Sb, which constitute the low-frequency component data. The write control section 6 generates successive write address values 6a and a write enable signal 6b, at appropriate timings whereby the low-frequency component data are selected from the compressed video signal Sb by being written into respective addresses of the memory 8.

The discrimination information signal 5a is further supplied to a read operation control section 50, which generates control signals 50a and 50b, supplied to a read control section 4 and a read control section 7 respectively. The read control section 4 supplies read address values 4a and a read enable signal 4b to the memory 2, while the read control section 7 supplies read address values 7a and a read enable signal 7b to the memory 8. The control signals 50a, 50b act on the read control section 4 and read control section 7 such as to ensure correct synchronization between the vacant intervals of the output data stream from the memory 2 and the intervals in which blocks of low-frequency component data are read out from the memory 8. A timing signal generation section 51 generates a second clock signal $CK_2$, having a higher frequency than the clock signal $CK_1$, and a reference timing signal ST. The signals $CK_2$ and ST are supplied to a recording signal generating section 9 and to the read operation control section 50, for controlling overall operation timings of these sections. The clock signal $CK_2$ is further supplied to the read control section 4 and to the read control section 7 as an operation clock signal, which determines the rate of data read-out from each of these memories.

As described above, data are read out from the memory 2 at a second data rate which is higher than the aforementioned first data rate at which the data were written into the memory 2. The data thus read out consist of successive fixed-length blocks of data, each formed of an integral number of sub-blocks such as the data portions 11 shown in diagram (B) of FIG. 4. Such sub-blocks, each of which have the aforementioned synchronizing, ID and error correction information portions (which are necessary for the recording/playback process) then attached thereto by the recording signal generating section 9, will be referred to in the following as synchronizing blocks. The data stored in the memory 2 and memory 8 are preferably read out as sets of integral units of these synchronizing blocks, i.e. a low-frequency component data block which is read out from the memory 8 during one of the aforementioned vacant intervals of the data stream read out from the memory 2 will preferably consist of an integral number of synchronizing blocks.

The data streams thus read out from the memory 2 and the memory 8 are combined into a single data stream by the recording signal generating section 9, which assigns a set of the aforementioned synchronizing, ID and error correction information portions to each of the synchronizing blocks.

Figure 8:
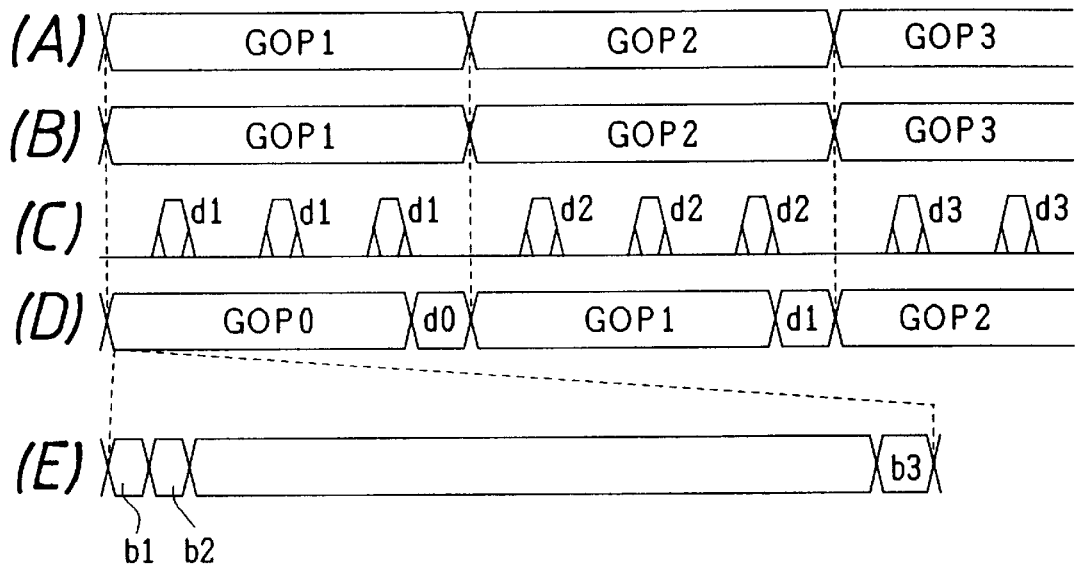
FIG. 8 is a timing diagram for illustrating the basic principles of operation of the first embodiment.

The above operation is illustrated in the conceptual timing diagrams of FIG. 8, assuming that the compressed video data is arranged in MPEG GOP units having the format shown in FIG. 1 and described hereinabove, and assuming that the compressed video data blocks which are read out from the memory 2 at the second data rate are respective GOP units. Diagram (A) in FIG. 8 illustrates the general structure of the compressed video signal Sb, which is successively written into the memory 2 at the aforementioned first data rate, and which for simplicity of description is assumed to consist only of successive GOP units GOP1, GOP2, etc. The data which are actually written into the memory 2 are illustrated in diagram (B) of FIG. 8, showing that all of the compressed video data are written into the memory 2. Diagram (C) in FIG. 8 conceptually illustrates the compressed video data elements which are selected as the low-frequency component data, by being written into the memory 8, showing how only specific sets of elements (designated as the set d1 from GOP 1, d2 in GOP 2, and so on) are selected from the compressed video data stream. Each of these sets can consist, for example, of the three low-order encoded DCT coefficients for a DCT block of an I-picture (with only three of the sets within each GOP unit being indicated in FIG. 8).

Diagram (D) of FIG. 8 illustrates the recording signal 9a which is derived by combining the data read out from the memory 2 and the memory 8 at the aforementioned second data rate. As shown for example, the plurality of low-frequency component data elements d1 corresponding to the GOP unit GOP1, which were written into the memory 8, are read out from that memory as a single low-frequency component data block d1, which is inserted into a vacant interval that occurs between reading out two successive data blocks (GOP1 and GOP2) from the memory 2.

As described above, each of the data blocks which are read out from the memories 2 and 8 preferably consists of an integral number of the aforementioned synchronizing blocks. One of these synchronizing blocks, constituting part of the GOP unit GOP0 after read-out from memory 2, is illustrated in diagram (E) of FIG. 8, with the aforementioned synchronizing, ID and error correction information portions b1, b2 and b3 having been attached thereto by the recording signal generating section 9.

Figure 2:
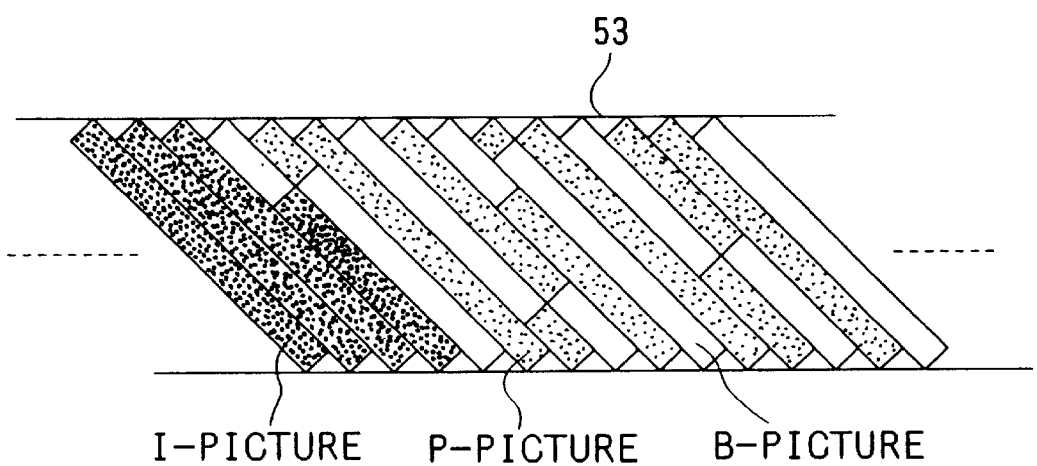
FIG. 2 shows a recording track pattern of 15 tracks on which a GOP data unit has been recorded by a helical scan rotary recording head of a VTR.
Figure 9:
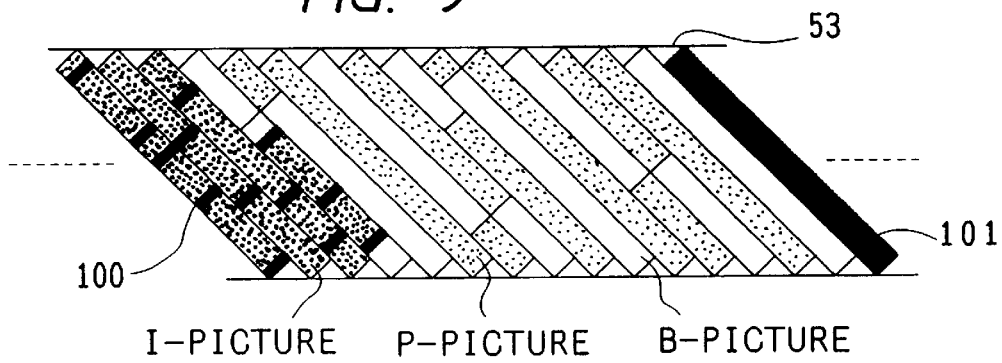
FIG. 9 shows a recording track pattern of 15 tracks on which a GOP data unit has been recorded by a helical scan rotary recording head, and an additional track on which low-frequency component data have been recorded, by the first embodiment.

FIG. 9 shows an example of the resultant track pattern which can be formed on the magnetic tape 53 by applying the recording signal 9a of the form shown in diagram (D) of FIG. 8, via the rotary recording head 52. It will be assumed that each low-frequency component data block that is read out from the memory 8 comprises a minimum necessary amount of information for updating a display picture (for example, contains all of the sets of 3 low-order DCT coefficients of one I-picture). The first 15 tracks from the left correspond to the 15 tracks shown in FIG. 2, on which are recorded 15 successive pictures of a GOP data unit. However the low-frequency component data block is recorded on an additional 16$^{th}$ track, which is shown as track 101 in FIG. 9. It can thus be understood that it now becomes possible, during high-speed playback, to efficiently read the low-frequency component data of respective I-pictures tracks such as track 101, since these data can be recorded on respective periodically occurring tracks on the magnetic tape.

As described above, in general only a portion of each track will be scanned by the recording head during high-speed playback. However a known technique exists whereby the axis of rotation of the rotary recording head can be suitably altered during high-speed playback, so that complete scanning of each of periodically occurring tracks can be achieved. In that case, complete picture updating can be achieved during high-speed playback each time a track such as track 101 of FIG. 9, containing low-frequency component data, is scanned. Highly effective high-speed playback operation is therefore made possible by the invention.

In the above description, with reference to the timing diagrams of FIG. 8, it has been assumed for simplicity that the intra-coded data (from which the low-frequency component data are extracted) occur in the compressed video signal Sb in a fixed periodic manner, i.e. as periodically occurring I-pictures. However in general the I-pictures will not occur in such a fixed periodic manner. Nevertheless, as described above, it is necessary to periodically read out a fixed amount of data from the memory 8 (i.e. from a fixed-size memory) as a block of low-frequency component data. Each such block may be, for example, data that are to fill one specific recording track of the magnetic tape, as in the example of FIG. 9. It is therefore necessary to control the selection of low-frequency component data from the memory 8 in accordance with the average proportion of intra-coded data within the input compressed video data stream, such as to ensure that memory overflow will not occur in the periods between read-out of a block of low-frequency component data from the memory 8, while also ensuring as far as possible that sufficient low-frequency component data for use in display picture updating will be written into the memory 8 during each of these periods. That function is performed by the write control section 6, as described hereinafter.

In the example of FIG. 9, it assumed that the low-frequency component data are recorded on respective single magnetic tape tracks which are aligned in the same manner as the tracks which are accessed during normal-speed playback. Various methods are known in the prior art for VTR variable-speed playback, whereby accurate tracking can be achieved in such a case. Such methods include AST (Automatic Scan Tracking), or methods, as mentioned above, whereby the mechanical system of the VTR is controlled during variable-speed playback such as to vary the angle of inclination of the rotational axis of the head cylinder, as described for example in Japanese Patent Laid-Open Publication 61-158633.

Figure 10:
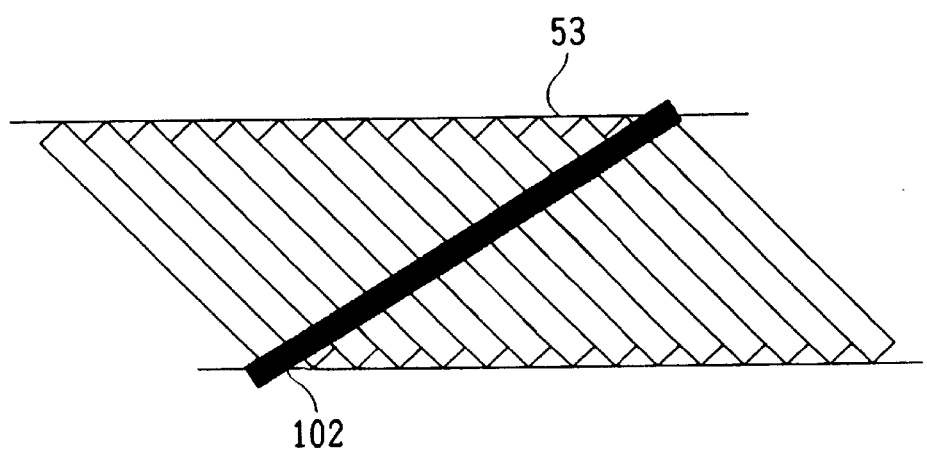
FIG. 10 shows another example of a recording track pattern which can be formed by a recording apparatus according to the present invention.

However it is also possible to modify the operation of the embodiment described above such as to divide a set of low-frequency component data corresponding to one I-picture (such as the portion d0 in diagram (D) of FIG. 8) into a plurality of blocks (each consisting of an integral number of the aforementioned synchronizing blocks), and to control the respective operations of the read control section 4 and read control section 7 shown in FIG. 6 such as to insert these low-frequency component data blocks into the recording signal 9a at timings whereby they will be recorded on respectively different successive tracks on the magnetic tape, at positions corresponding to a path that is scanned by the rotary head of the VTR during variable-speed playback at a specific speed. Such a path is illustrated by the black strip 102 shown in FIG. 10. If that is done, then it would be unnecessary to utilize a special technique such as altering the inclination angle of the rotary head cylinder, to achieve a maximum rate of display picture updating together with satisfactory picture quality, during variable-speed playback.

Figure 7:
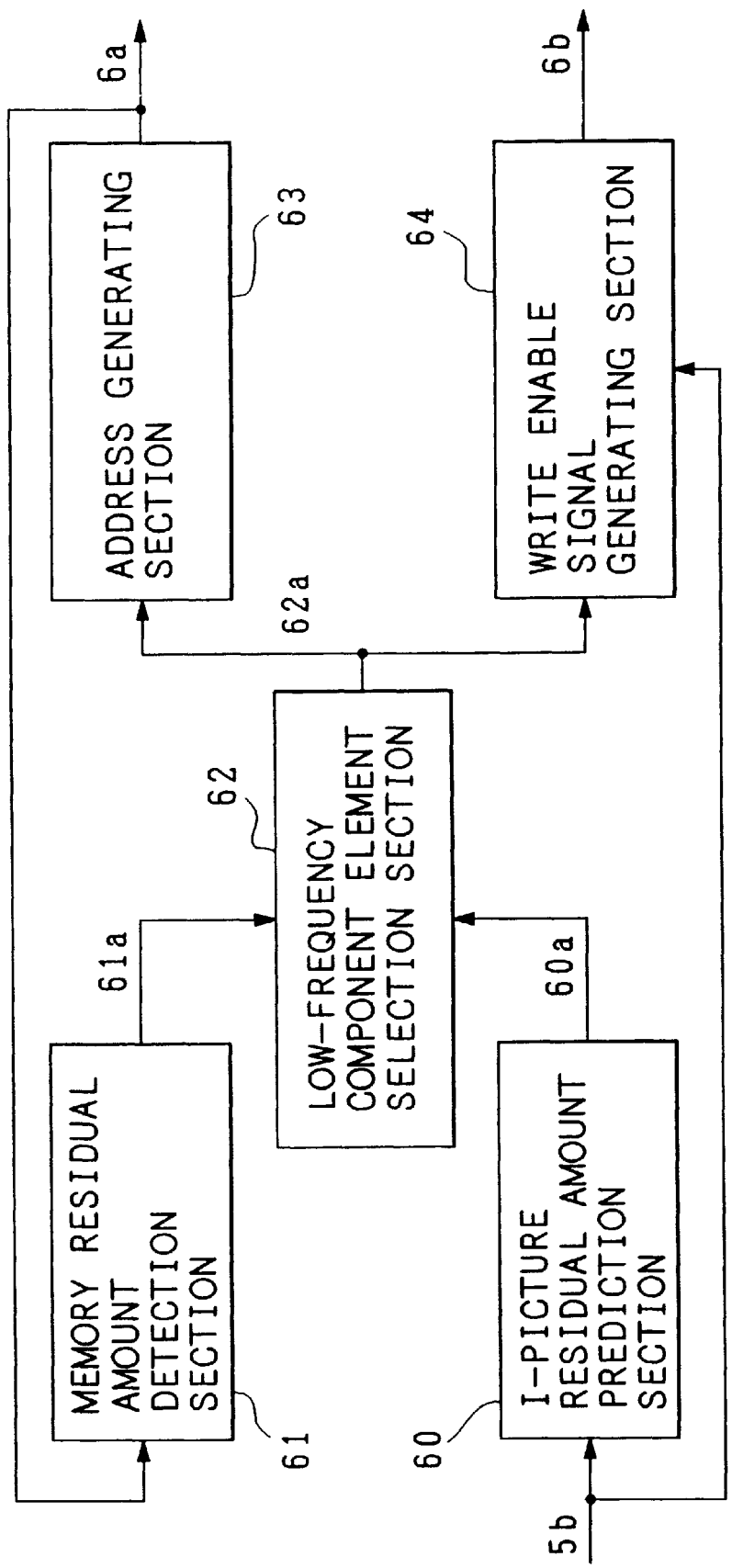
FIG. 7 is a general system block diagram showing the internal configuration of a memory write control section in the embodiment of FIG. 6.

FIG. 7 is a general system block diagram showing the internal configuration of the write control section 6 of the first embodiment. This is made up of an address generating section 63 which generates the address values 6a and a write enable signal generating section 64 which generates the write enable signal 6b, a memory residual amount detection section 61 which receives the address values 6a, an I-picture residual amount prediction section 60 which receives the discrimination information signal 5b, and a low frequency component element selection section 62 which is controlled by a combination of output signals 61a and 60a from the memory residual amount detection section 61 and I-picture residual amount prediction section 60 to produce a selection signal 62a which is supplied to the address generating section 63 and write enable signal generating section 64.

The operation of the write control section 6 is as follows. In the intervals between read-out of successive blocks of low-frequency component data from the memory 8, the I-picture residual amount prediction section 60 functions to predict the amount of low-frequency component data which remains to be written into the memory 8, (to complete the amount of low-frequency component data for one I-picture, i.e. the amount of data which is periodically read out as a block from memory 8). The output signal 60a is indicative of that amount of data which has not yet been written into the memory 8. The memory 8 is assumed to have only sufficient capacity to store aforementioned amount of low-frequency data for one I-picture. The memory residual amount detection section 61 detects the amount of vacant memory capacity remaining in the memory 8, with the output signal 61a being indicative of that remaining amount. The amounts expressed by these signals 61a, 60a are compared in the low frequency component element selection section 62, whose output signal 62a controls the address generating section 63 and write enable signal generating section 64 to write into the memory 8 the appropriate number of low-frequency component data, until the memory 8 becomes filled.

There are two possibilities for the intra-coded data within the data stream of the digital video signal Sb. In one case, the intra-coded data occur (as I-pictures) at regular intervals, while in the second case, the intra-coded data do not occur at regular intervals. In the first case, the I-picture residual amount prediction section 60 need only count the number of DCT blocks (of an I-picture) that have been encountered, in relation to the total number of DCT blocks of an I-picture, to generate the indication signal 60a. In the second case, the I-picture residual amount prediction section 60 must use the average probability of occurrence of I-pictures within the compressed video signal Sb, and generate the signal 60a such that the necessary amount of low-frequency video component data will be written into the memory 8 during each of the fixed intervals between read-out of the aforementioned low-frequency component data blocks from the memory 8.

If the intra-coded data do not occur at regular intervals within the input compressed video data stream, a condition can occur whereby it will be predicted (based on the input signals 61*a*, 60*a* to the low frequency component element selection section 62) that the amount of low-frequency component data which will be acquired within an interval between read-out of one data block from the memory 8 and read-out of the suceeding block will be greater than the data block size, i.e. greater than the capacity of the memory 8. To cover such a case, there are two possible methods for the low frequency component element selection section 62 to control the writing of low-frequency component data into the memory 8, i.e.:

(a) The amount o f data acquired for each DCT block can be reduced. That is, the low frequency component element selection section 62 can control data write-in to the memory 8 such that the number of DCT coefficient code values written into the memory 8, for each DCT block, is reduced, or:

(b) Once a sufficient amount of low-frequency component data, obtained for successive DCT blocks, has been written into the memory 8 (for example, the low-frequency component data for one I-picture), write-in to the memory 8 is halted until after the next data read-out from memory 8 has been completed.

Figure 11:
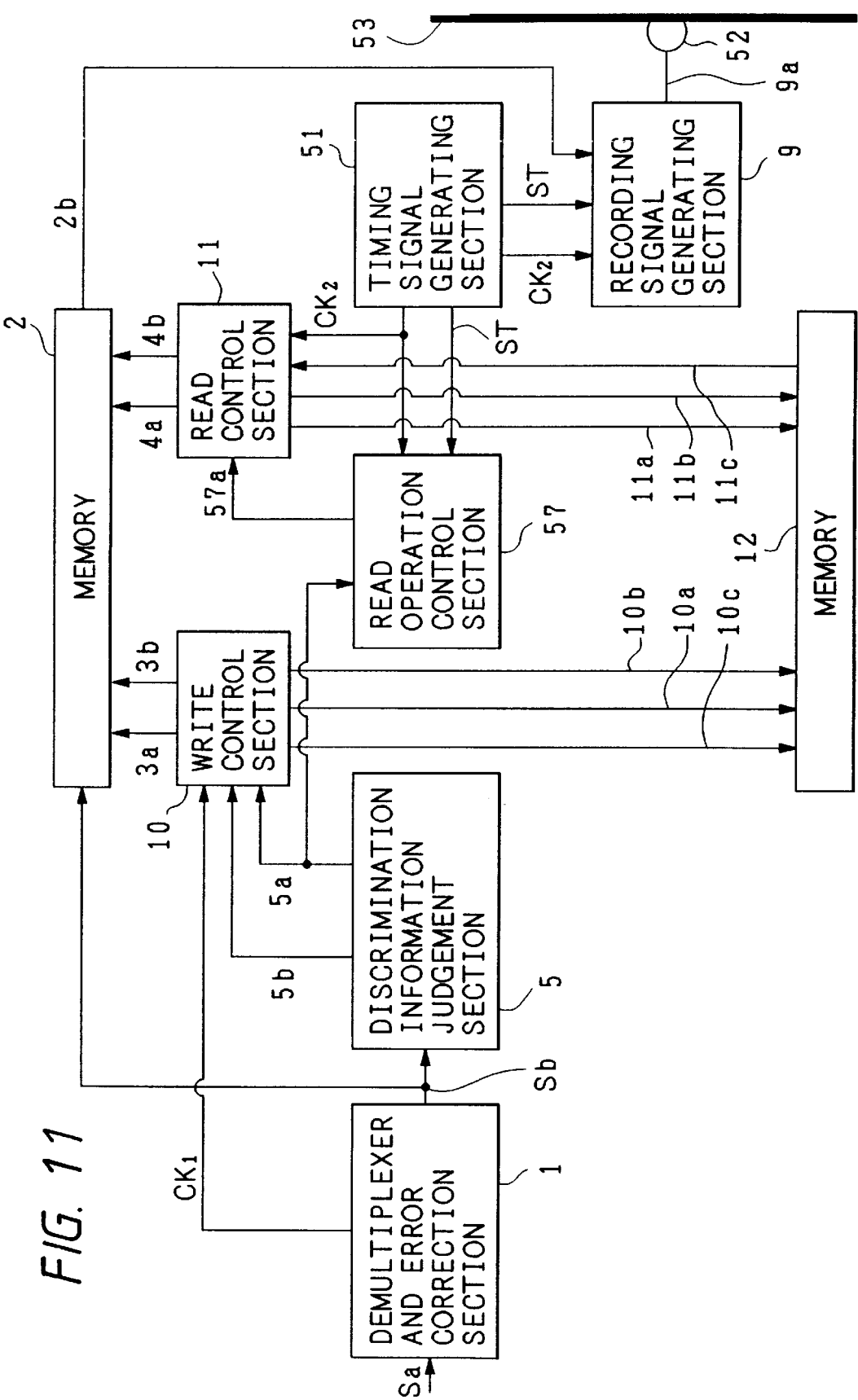
FIG. 11 is a general system block diagram of a second embodiment of a compressed video data recording apparatus according to the present invention.

FIG. 11 is a general system block diagram of a second embodiment of the invention. This embodiment differs from the first embodiment in the following respects. With the first embodiment, the overall compressed video data (i.e. the data which are utilized during normal-speed playback of the VTR) are stored in one memory, and the low-frequency component data in a second memory. With the second embodiment, only a first memory is utilized for writing in the compressed video data (which of course include the low-frequency component data), while the addresses at which the low-frequency component data are stored in the first memory are written into a second memory. The compressed video data and the low-frequency component data are respectively read out from the first memory, at a higher data rate than that used during write-in, such as to be combined within a recording signal in the same manner as described for the first embodiment.

In FIG. 11, the first memory (into which all of the compressed video data of signal Sb are successively written) is designated by numeral 2, and the second memory (into which are written the values of addresses where low-frequency component data are written into the memory 2) by numeral 12. As in the first embodiment, the input compressed video signal Sa are supplied to a demultiplexer and error correction section 1, to obtain an error-corrected compressed video signal Sb which is supplied to a discrimination information judgement section 5, and to generate a first clock signal $CK_1$. As in the first embodiment, the discrimination information judgement section 5 produces a discrimination information signal 5*a* which indicates the timings of each of the elements of the compressed video data of signal Sb, and a discrimination information signal 5*a* which indicates the timings of the low-frequency component data, which are to be selected from the compressed video data elements. The discrimination information signals 5*a*, 5*b* are supplied to a write control section 10, while the discrimination information 5*a* is also supplied to a read operation control section 57. The write control section 10 generates address values 3*a* and a write enable signal 3*b*, which are supplied to the memory 2 to control write-in of the compressed video data of signal Sb at a first data rate, i.e. in synchronism with the clock signal $CK_1$. In addition, the write control section 10 generates address values 10*a* and a write enable signal 10*b*, which are supplied to the memory 12, to control write-in of the values of addresses where the low-frequency component data elements are written into the memory 2. These address values are supplied from the write control section 10, as signal 10*c*, to be written into the memory 12, in accordance with address values 10*a* and write enable signal 10*b* which are produced from the write control section 10.

The read control section 11 generates read address values 4*a* and a read enable signal 4*b*, which are supplied to the memory 2, for reading out the overall compressed video data at second data rate, which is higher than the data rate at which compressed video data are written into the memory 2, in the same way as for the first embodiment. However the read control section 11 further generates read address values 11*a* and a read enable signal 11*b*, which are supplied to the memory 12. During each interval between reading out successive blocks of compressed video data from the memory 2, the address values 10*c* which have been written into the memory 12 are read out (at the second data rate) as consecutive sets of address values 11*c*, which are supplied to the read control section 11.

The apparatus further includes a recording signal generating section 9 for receiving the data read out from the memory 2, and producing a corresponding recording signal 9*a*, a read operation control section 57, and a timing signal generation section 51 which produces a second clock signal $CK_2$ and reference timing signal ST, which are supplied to the read operation control section 57 and recording signal generating section 9 for controlling operation timings of these sections. The clock signal $CK_2$ is also supplied to the read control section 11, for setting the rate of data read-out from the memory 2 at a higher value than that of data write-in, in the same way as for the first embodiment. With this embodiment, the read operation control section 57 produces a control signal 57*a* which acts on the read control section 11 as follows. In the same way as for the first embodiment, successive fixed-length blocks of compressed video data are read out from the memory 2, in response to the address and read enable signals 4*a*, 4*b* generated by the read control section 11, with fixed-length vacant intervals occurring between these blocks of compressed video data. During each of these vacant intervals, for example between the GOP blocks GOP0 and GOP1 in diagram (D) of FIG. 8, the read control section 11 sequentially generates the address values of the memory 12 (as signal 11*a*), and correspondingly controls the read enable signal 11*b*, so that the address values which have been written in the memory 12 are successively read out (as signal 11*c*) and transferred to the read control section 11. The read control section 11 transfers these address values (as address values 4*a*) to the memory 2, and correspondingly controls the read enable signal 4*b*, so that a block of low-frequency component data (for example, the block d0 shown in diagram (D) of FIG. 8) is read out from the memory 2, and supplied to the recording signal generating section 9. Section 11 then again begins to generate address values 4*a* and the read enable signal 4*b* for reading out the compressed video data from the memory 2 (e.g. block GOP1 in diagram (D) of FIG. 8). Changeover between these two types of operation by the read control section 11, i.e. between the operation of internally generating address values for the compressed video data and the operation of reading out the low-frequency component data addresses from the memory 12, is controlled by the signal 57*a* from the read operation control section 57.

It can thus be understood that this embodiment can provide similar effects to those obtainable by the first embodiment described above. In the same way as for the first embodiment, the compressed video data and low-frequency component data which are thus read out from the memory 2 and supplied to the recording signal generating section 9 are preferably read out in fixed-length synchronizing blocks (illustrated in diagram (E) of FIG. 8) which are appropriate for constituting the recording signal, and ID, synchronizing and error correction information portions are added to complete each of these synchronizing blocks by the recording signal generating section 9, to thereby obtain the recording signal 9a.

Figure 12:
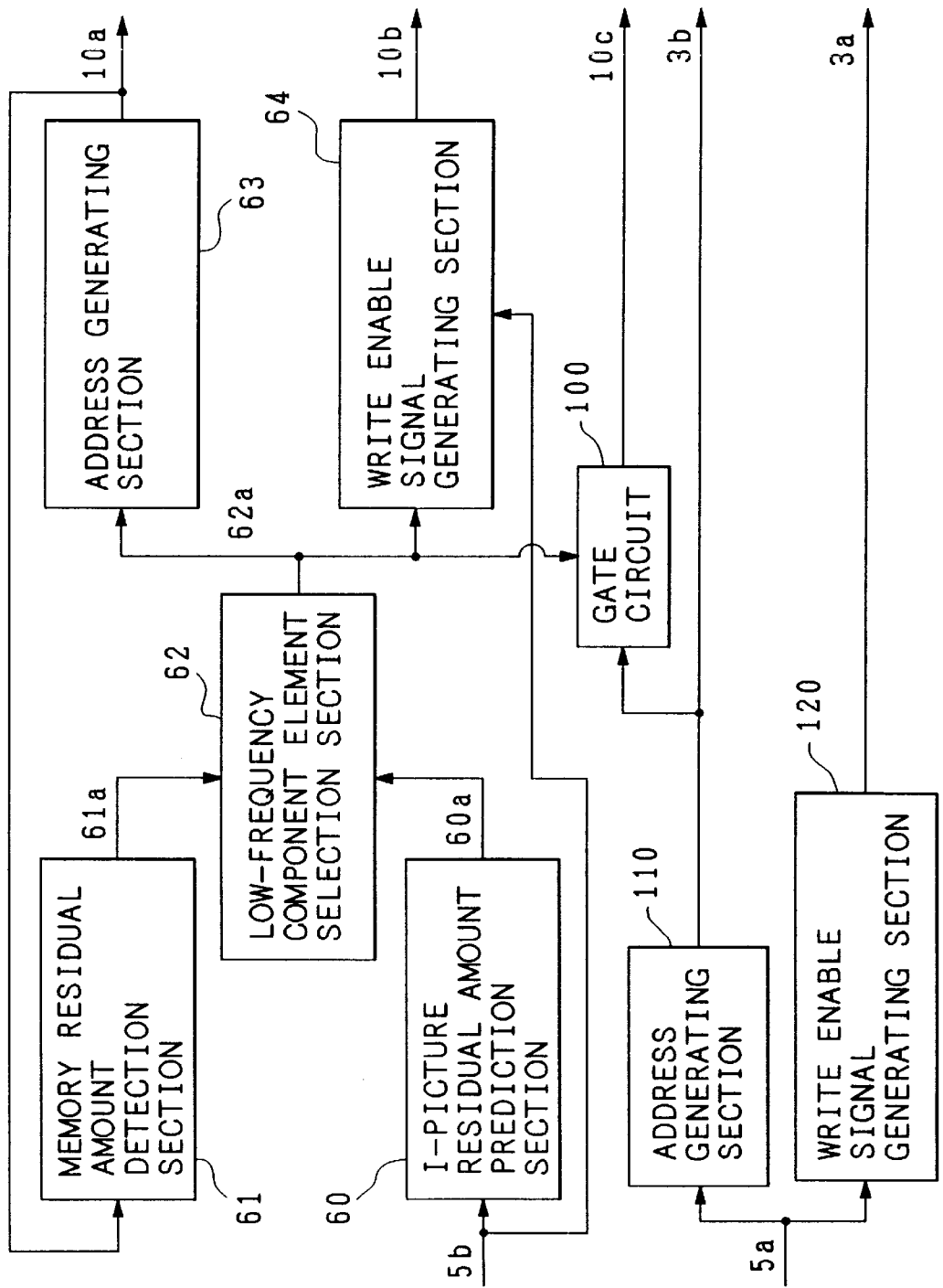
FIG. 12 is a general system block diagram showing the internal configuration of a memory write control section in the second embodiment.

FIG. 12 is a general system block diagram of the write control section 10 of the embodiment of FIG. 11. This includes a portion, for generating the address and write enable signals 10a, 10b for the memory 12, which has an identical configuration to that shown in FIG. 7 and described hereinabove. That portion consists of a memory residual amount detection section 61, a I-picture residual amount prediction section 60, a low frequency component element selection section 62, an address generating section 63 and a write enable signal generating section 64, for which further description will be omitted. The circuit of FIG. 12 further includes a gate circuit 100 which is controlled by the output signal 62a from the low frequency component element selection section 62, i.e. by a signal which controls the selection of the data elements that are written into the write control section 10 as the low-frequency component data. The circuit of FIG. 12 further includes an address generating section 110 and a write enable signal generating section 120, which are controlled by the discrimination information signal 5a from the discrimination information judgement section 5, and which produce the write enable signal 3a and the address values 3b, respectively, which are used as described above for writing all of the compressed video data elements of signal Sb into the memory 2. The address values 3a are also supplied to the gate circuit 100, whereby the addresses of the memory 2 into which the low-frequency component data are written are selected by the gate circuit 100, and supplied (as the address values 10c) to be written into the memory 12 of the second embodiment.

Figure 13:
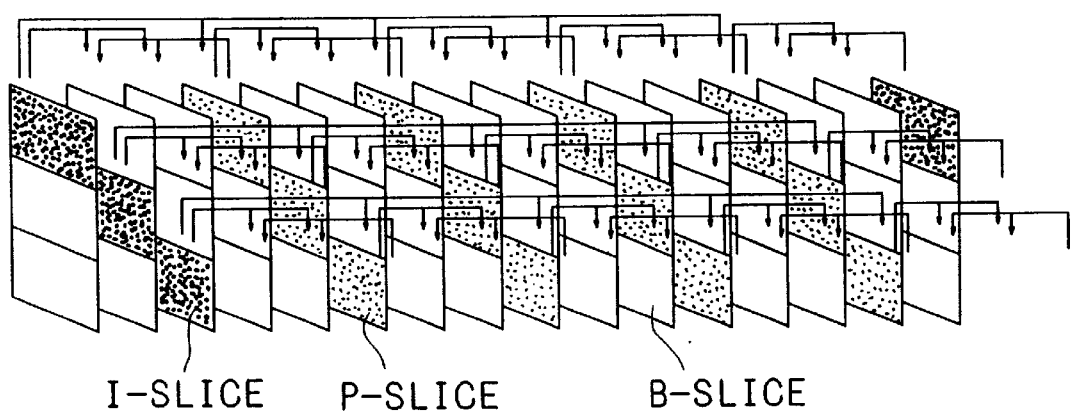
FIG. 13 is a conceptual diagram for illustrating a compressed video data stream made up of data slices.

In the above description, it has been assumed that the intra-coded data only occurs in picture units, i.e. the I-pictures. However as illustrated in FIG. 13, in some cases the intra-coded data may occur in picture sub-units which are referred to as slices. The invention is equally applicable to such a type of compressed video data. Specifically, the compressed video data can be written in the memory 2 as described for the first embodiment above. At the same time, the elements of the low-frequency component data are selected from the I-slices as they occur, i.e. as designated by the discrimination information from the discrimination information judgement section 5, and written into the memory 8, and read out periodically (at the second operating clock rate) as low-frequency component data blocks, which are inserted into the corresponding vacant intervals of the data read out from the memory 2, and the resultant data stream supplied to the recording signal generating section 9 to form the recording signal 9a. That is possible, since the discrimination information obtained from the MPEG syntax data can be used to specify respective data elements, i.e. specific DCT coefficients within respective DCT blocks at specific positions of a picture. So long as it is ensured that the blocks of low-frequency component data (for example, corresponding to the blocks d0, d1, etc. in diagram (D) of FIG. 8) are read out from the memory 8 at fixed periodic intervals, (for example to to be written on respective tracks of the magnetic tape as illustrated in FIG. 9), similar effects can be obtained to those which have been described for the case of intra-coded data which occurs in integral units of I-pictures. Irrespective of whether the input compressed video signal Sb contains the intra-coded data as I-pictures which do not occur with a regular period, or as I-slices, the memory 8 (or memory 12) functions as a buffer memory for the low-frequency component data, enabling fixed-size blocks of low-frequency component data to be inserted into the recording signal at appropriate timings.

Although the invention has been described in the above with respect to the MPEG format for compressed video data, it should be understood that the invention is not limited in its applications to such a compressed video data format. The essential features of the invention are that data which are essential for providing at least a minimum degree of recognition of a finally obtained display picture, referred to in the above as low-frequency component data, are extracted from the intra-coded data of a stream of compressed video data which represent successive pictures, that the compressed video data and low-frequency component data are each subjected to time axis compression and combined to obtain a data stream which is converted to a recording signal, and recorded on a magnetic tape. The time axis-compressed compressed video data and low-frequency component data are combined in such a manner that the low-frequency component data are recorded as successive blocks at positions on the recording track whereby during subsequent variable-speed playback of the recording track, the low-frequency component data can be effectively read from the recording track.

More specifically, the present invention as exemplified by the above embodiments has the following basic features:

(a) A continuous stream of compressed video data expressing respective pictures is supplied to a first memory, and successive fixed-size portions of the compressed video data are sequentially written into the first memory at a first data rate, and are sequentially read out from that memory at a second data rate which is higher than the first data rate. That data read-out is determined (i.e. in accordance with the difference between the first and second data rates) such that vacant time intervals of specific duration periodically occur in the output data flow from the first memory, at regular intervals.

(b) While the compressed video data are being written into the first memory, sets of low-frequency component data (each set consisting of elements of the compressed video data that are the minimum essential data for use in updating a display picture) are selected from the compressed video data and written into a second memory (or a separate region of the first memory);

(c) The low-frequency component data are read out from the second memory as fixed-size blocks, at the second data rate, during the aforementioned vacant time intervals, and combined with the data read out from the first memory into a single data stream, which is processed to form a recording signal; and (d) The aforementioned time intervals are selected such that the low-frequency component data are recorded at specific positions on a recording track, these positions being predetermined such that the low-frequency component data can be effectively read from the magnetic tape during subsequent variable-speed playback operation.

For example in the case of the track pattern example of FIG. 9 described above, each low-frequency component data block must be read out at the appropriate timing to form a single track on the magnetic tape. In the case of the track pattern example of FIG. 10, the low-frequency component data selected from the intra-coded data of a GOP unit must be divided into a plurality of blocks, which are read out in intervals respectively timed such as to form recording track portions that are aligned with the path shown in FIG. 10.

In the above, the use of the MPEG-1 compressed video data has been assumed in describing the embodiments. However the invention is equally possible to compressed video data which are supplied as a stream of transport packets, such as the MPEG-2 format. In that case, each of the above embodiments could be modified to implement one of the following three possible methods of inserting the low-frequency component data into the recording signal data:

(1) Specific transport packets can be selected, as the low-frequency component data, and written into memory (e.g. memory 8 of the first embodiment above);

(2) Part of the contents of each of specific transport packets can be extracted, as the low-frequency component data, formed into transport packets, then written into memory in that form; or (3) Part of the contents of each of specific transport packets can be extracted, as the low-frequency component data, which are then written into memory, and are subsequently formed into transport packets when read out of memory.

With either of the above methods, the compressed video data are of course written into and read out from memory (e.g. in memory 2 of the first embodiment above), in the form of transport packets, so that the recording signal can be formed of a stream of compressed video data transport packets and low-frequency component data transport packets. In other respects, the operation can be basically similar to that of either of the two embodiments described above.

As will be understood from the above, the invention successfully overcomes the problems of the prior art with regard to variable-speed playback of recorded compressed video data, enabling satisfactory display picture quality and rapid picture updating to be obtained during high-speed playback.

What is claimed is:

1. A compressed video data recording apparatus for processing a stream of compressed video data which expresses a sequence of GOP (Group-of-Pictures) units, each of said GOP units containing intra-coded pictures, predictive-coded pictures and bidirectionally predictive-coded pictures, to obtain a recording signal, and for recording said recording signal on a magnetic tape by utilizing a rotary recording head, the apparatus comprising:

first memory means (2) for storing said compressed video data;

first control means (5,3) for controlling writing of said compressed video data into said first memory means (2) at a first data rate, as successive ones of said GOP units;

second memory means (8);

second control means (5, 6) for deriving, from said stream of compressed video data, discrimination information indicative of respective positions within said stream of specific low-frequency component data, for utilizing said discrimination information to select, from each of said GOP units in said compressed video data flow, a set of low-frequency component data, each of said set of low-frequency component data sets conveying a minimum amount of information necessary to generate a recognizable display picture, and for controlling successive writing of said low-frequency component data sets into said second memory means (8) at said first data rate;

third control means (5, 4) for controlling reading out of said compressed video data from said first memory means (2) as sequential compressed video data blocks, each of predetermined length, at a second data rate which is higher than said first data rate, and for establishing respective vacant time intervals of predetermined length between successive ones of said compressed video data blocks read out from said first memory;

fourth control means (5, 7) for controlling reading out of said low-frequency component data sets from said second memory means (8), as sequential low-frequency component data blocks each of predetermined length, at said second data rate, during respective ones of said vacant time intervals; and recording signal generating means (9) for adding at least synchronizing information and error correction information to each of said compressed video data blocks and each of said low-frequency component data blocks read out from said first memory means (2) and second memory means (8) respectively, and for combining said compressed video data blocks and said low-frequency component data blocks to obtain said recording signal.

2. A compressed video data recording apparatus for processing a stream of compressed video data which expresses a sequence of GOP (Group-of-Pictures) units, each of said GOP units containing intra-coded pictures, predictive-coded pictures and bidirectionally predictive-coded pictures, to obtain a recording signal, and for recording said recording signal on a magnetic tape by utilizing a rotary recording head, the apparatus comprising:

first memory means (2) for storing said compressed video data;

second memory means (12) for storing address indication data indicative of respective addresses in said first memory means (2);

first control means (5, 10) for deriving, from said stream of compressed video data, discrimination information indicative of positions of specific low-frequency component data within said stream, for controlling writing of said compressed video data at a first data rate into respective addresses of said first memory means (2) as successive ones of said GOP units, for utilizing said discrimination information to derive, for respective ones of said GOP units of said compressed video data flow, address indication data indicative of addresses within said first memory means (2) which contain sets of low-frequency component data respectively corresponding to said GOP units, each of said sets of low-frequency component data conveying a minimum amount of information necessary to generate a recognizable display picture, and for controlling writing of said address indication data into said second memory means (12) at said first data rate;

second control means (11) for controlling reading out of said compressed video data from said first memory means at a second data rate which is higher than said first data rate, as sequential fixed-length compressed video data blocks, for establishing respective vacant time intervals of predetermined length between successive ones of said compressed video data blocks read out from said first memory means, for controlling reading out of said address indication data from said second memory means (12) at said second data rate, and for utilizing said address indication data to control reading out of said sets of low-frequency component data from said first memory means (2) at said second data rate, as sequential fixed-length low-frequency component data blocks, and for reading each of said low-frequency component data blocks during a corresponding one of said vacant time intervals, and recording signal generating means (9) for adding at least synchronizing data and error correction data to each of said compressed video data blocks and to each of said low-frequency component data blocks read out from said first memory means (2), and for combining said compressed video data blocks and said low-frequency component data blocks to obtain said recording signal.

3. The compressed video data recording apparatus according to claim 1, wherein said second control means (5, 6) comprises:

intra-coded picture residual amount prediction means (60) for functioning during each of respective intervals between read-out of successive ones of said low-frequency component data blocks from said second memory means (8) to utilize said discrimination information to predict, for an intra-coded picture of said compressed video data stream, an amount of lowfrequency component data of said intra-coded picture which remains to be written into said second memory means (8) as said low-frequency component data sets, and for generating a first indication signal (60a) indicative of said amount;

memory residual amount detection means (61) for detecting an amount of residual vacant memory capacity of said second memory means (2) and for generating a second indication signal (61a) indicative of said amount;

low-frequency component selection means (62) for comparing said first indication signal (60a) and said second indication signal (61a) to obtain a comparison result indicative of a number of said low-frequency component data sets which remain to be written into said second memory means (8), and for generating a control signal (62a) in accordance with said comparison result; and address generating means (63) for generating, based on said control signal (62a) from said low-frequency component selection means (62), address information (6a) which specifies respective addresses for writing said remaining low-frequency component data sets into said second memory means (8).

4. The compressed video data recording apparatus according to claim 2, wherein said second control means (5, 10) comprises:

intra-coded picture residual amount prediction means (60) for functioning during each of respective intervals between read-out of successive ones of said low-frequency component data blocks from said first memory means (12) to utilize said discrimination information to predict, for an intra-coded picture of said compressed video data stream, an amount of low-frequency component data of said intra-coded picture which remains to be written into said first memory means (2), and for generating a first indication signal (60a) indicative of said amount;

memory residual amount detection means (61) for detecting an amount of residual vacant memory capacity of said second memory means (12) and for generating a second indication signal (61a) indicative of said amount;

low-frequency component selection means (62) for comparing said first indication signal (60a) and said second indication signal (61a) to obtain a comparison result indicative of a number of said low-frequency component data sets for which respective storage addresses in said first memory means (2) remain to be written into said second memory means (12), and for generating a control signal (62a) in accordance with said comparison result; and address information control means (100, 110) for generating, based on said control signal (62a) from said low-frequency component selection means (62), address information for writing into said second memory means (12) respective addresses of said first memory means (2) into which are written said low-frequency component data sets.

5. A method of recording compressed video data for processing a stream of compressed video data to obtain a recording signal and recording said recording signal on a magnetic tape by utilizing a rotary recording head, wherein said stream of compressed video data expresses a sequence of GOP (Group-of-Pictures) units, each of said GOP units containing intra-coded pictures, predictive-coded pictures and bidirectionally predictive-coded pictures, the method comprising:

controlling writing of said compressed video data into first memory means (2) at a first data rate, as successive ones of said GOP units;

deriving, from said stream of compressed video data, discrimination information indicative of respective positions within said stream of specific low-frequency component data, utilizing said discrimination information to select, from each of said GOP units in said compressed video data flow, a set of low-frequency component data, each set of said low-frequency component data conveying a minimum amount of information necessary to generate a recognizable display picture, controlling successive writing of said low-frequency component data sets into second memory means (8) at said first data rate;

controlling reading out of said compressed video data from said first memory means (2) as sequential compressed video data blocks, each of predetermined length, at a second data rate which is higher than said first data rate, establishing respective vacant time intervals of predetermined length between successive ones of said compressed video data blocks read out from the first memory means;

controlling reading out of said low-frequency component data sets from said second memory means (8), as sequential low-frequency component data blocks each of predetermined length, at said second data rate, during respective ones of said vacant time intervals;

adding at least synchronizing information and error correction information to each of said compressed video data blocks and each of said low-frequency component data blocks read out from said first memory means (2) and second memory means (8) respectively, and combining said compressed video data blocks and said low-frequency component data blocks to obtain said recording signal.

6. A method of recording compressed video data for processing a stream of compressed video data to obtain a recording signal and recording said recording signal on a magnetic tape by utilizing a rotary recording head, wherein said stream of compressed video data expresses a sequence of GOP (Group-of-Pictures) units, each of said GOP units containing intra-coded pictures, predictive-coded pictures and bidirectionally predictive-coded pictures, the method comprising:

deriving, from said stream of compressed video data, discrimination information indicative of positions of specific low-frequency component data within said stream, controlling writing of said compressed video data at a first data rate into respective addresses of first memory means (2) as successive ones of said GOP units, utilizing said discrimination information to derive, for respective ones of said GOP units of said compressed video data flow, address indication data indicative of addresses within said first memory means (2) which contain sets of low-frequency component data respectively corresponding to said GOP units, each of said sets of low-frequency component data conveying a minimum amount of information necessary to generate a recognizable display picture, and controlling writing of said address indication data into second memory means (12) at said first data rate;

controlling reading out of said compressed video data from said first memory means at a second data rate which is higher than said first data rate, as sequential fixed-length compressed video data blocks, establishing respective vacant time intervals of predetermined length between successive ones of said compressed video data blocks read out from said first memory means, controlling reading out of said address indication data from said second memory means (12) at said second data rate, utilizing said address indication data to control reading out of said sets of low-frequency component data from said first memory means at said second data rate, as sequential fixed-length low-frequency component data blocks each of which is read out during a corresponding one of said vacant time intervals, and adding at least synchronizing data and error correction data to each of said compressed video data blocks and to each of said low-frequency component data blocks read out from said first memory means (2), and combining said compressed video data blocks and said low-frequency component data blocks to obtain said recording signal.

* * * * *

UNITED STATES PATENT AND TRADEMARK OFFICE
CERTIFICATE OF CORRECTION

PATENT NO. : 6,169,846 B1  Page 1 of 1
DATED : January 2, 2001
INVENTOR(S) : Ohishi It is certified that error appears in the above-identified patent and that said Letters Patent is hereby corrected as shown below:

Paragraph Item [63] Related U.S. Application Data should read as follows:

Continuation of application No. 08/899,156, filed on June 30, 1998, now abandoned, which is a continuation of application No. 08/899,156 filed on July 23, 1997, now abandoned, which is a continuation of application No. 08/405,675, filed on March 17, 1995, now abandoned.

Signed and Sealed this

Eighteenth Day of December, 2001

Attest:

Attesting Officer

JAMES E. ROGAN
*Director of the United States Patent and Trademark Office*